Figure 1:
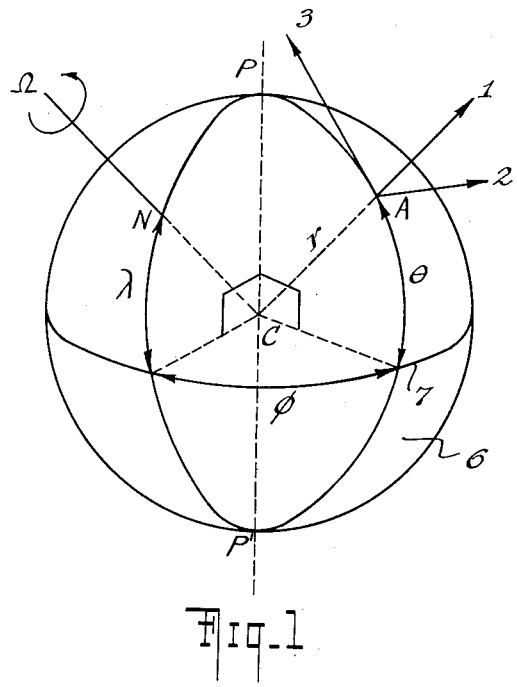

April 4, 1961 N. E. FRENCH 2,977,804
POSITION INDICATING NAVIGATION SYSTEMS
Filed Nov. 4, 1955 3 Sheets-Sheet 1

INVENTOR
NORMAN E. FRENCH
BY
Herbert H. Thompson
ATTORNEY

INVENTOR
NORMAN E. FRENCH
BY
Herbert H. Thompson
ATTORNEY

United States Patent Office 2,977,804
Patented Apr. 4, 1961

2,977,804
POSITION INDICATING NAVIGATION SYSTEMS

Norman Edward French, Seaford, England, assignor to The Sperry Gyroscope Company Limited, Brentford, England, a company of Great Britain Filed Nov. 4, 1955, Ser. No. 544,969
Claims priority, application Great Britain Nov. 15, 1954
23 Claims. (Cl. 73—488)

This invention is concerned with navigation apparatus for craft, a specific application of the invention being concerned with navigation apparatus for computing at least two of the co-ordinates of the instantaneous position of the craft in a predetermined main co-ordinate system fixed in the earth from data that includes measures of accelerations provided by accelerometers.

In the specification of U.S. application No. 215,221 entitled Integrating Systems Particularly for Use in Position-Indicating Navigation System filed March 13, 1951, in the name of Hugh Brougham Sedgfield there is described, in particular, a navigation system for computing height, longitude and latitude of an aircraft by doubly integrating the outputs of accelerometers maintained with their axes in directions pointing vertically upwards, horizontally to the east and horizontally to the north respectively. The system computes from the measures of acceleration, measures of the easterly and northerly velocities of the craft and converts these into rates of change of longitude and latitude. These rates are integrated to determine the craft's position in longitude and latitude. The system thus measures or computes accelerations, velocities and displacements in a system of co-ordinate axes whose directions are the local vertical of the craft, the local easterly direction and the local northerly direction. These local co-ordinate axes move with the craft over the earth's surface, turning in space as they do, and, the measured and computed quantities used in the system are quantities measured or computed relatively to these moving local co-ordinate axes, or, rather, relatively to co-ordinate axes centred at the centre of the earth parallel to these local co-ordinate axes and turning in space with the local co-ordinate axes as the local co-ordinate axes move with the craft over the earth's surface. The formulae required in the computation are, therefore, the formulae concerned with differentiation and integration of component quantities measured relatively to rotating axes. The computer used in the system also computes, from the computed measures of the component velocities parallel to these co-ordinate axes, measures of the component angular velocities of the axes themselves.

The formulae used in the system become unmanageable if the craft is in the vicinity of the North Pole because certain of the quantities occurring in the formulae become infinite at the North Pole. In consequence, the computer ceases to be accurate for flights carried out in the vicinity of the North Pole. In particular it is estimated that errors in the computation become too large to be satisfactory if the craft passes within 20° of the Pole.

A particular application of the present invention provides a modification of the navigation system described in the specification of the aforementioned U.S. application No. 215,221 capable of computing with accuracy the position of a craft navigating in the vicinity of the Pole itself. To this end the computation is carried out not in the usual longitude and latitude co-ordinates related to the earth's true polar axis but in a selected geometrically similar system of polar co-ordinates represented by lines similar to longitude and latitude lines drawn on the earth's surface with some arbitrary point instead of the North Pole of the earth acting as the pole of the system. Such a co-ordinate system has already been proposed for use in navigation over the North Pole by Mr. W. A. W. Fox in the Journal of the Institute of Navigation, Vol. 2, Number 1, for January 1949 in an article entitled "Transverse Navigation" and reference may be had to this article for further information concerning it. In the article the new co-ordinate system is referred to as the "oblique" polar co-ordinate system. In the system an arbitrary point on the earth's surface is chosen as the oblique north pole, the diameter of the earth through this pole being designated the oblique polar axis. A set of oblique meridian planes passing through the oblique polar axis intersects the earth's surface in circles of oblique longitude passing through the oblique poles and a set of parallel planes perpendicular to the oblique polar axis intersects the earth's surface in circles of oblique latitude. For purposes of measurement a particular line of oblique longitude or oblique meridian plane must be selected as the zero from which oblique longitude is measured. This reference meridian is taken to be the meridian containing the oblique polar axis and the earth's true polar axis of rotation. At any point on the earth's surface the direction of the local line of oblique longitude pointing to the end of the polar axis taken as the oblique north pole, is the oblique north direction. The oblique easterly direction is of course naturally defined by and lies along the local line of oblique latitude.

The object of the present invention is to provide a navigation system for computing, in any selected spherical polar co-ordinate system rotating with the earth and arbitrarily located with respect to it, data concerning the movement of the craft.

According to one aspect of the invention there is provided navigation apparatus for computing the components of the velocity of a moving craft relative to the centre of the earth in at least two of the directions of the axes of a local co-ordinate system located at the position of the craft, moving therewith, and having its axes directed at each position of the craft in the vertical and oblique northerly and oblique easterly horizontal directions, respectively, from data including measures of the components of the acceleration of the craft in the said two directions of the local co-ordinate system.

According to another aspect of the invention there is provided navigation apparatus for computing the oblique longitude and the oblique latitude of a craft from data including measures of the components of the acceleration of the craft in the oblique easterly and the oblique northerly directions, as hereinbefore defined.

Preferably the oblique longitude and the oblique latitude of the craft are computed from the measures of the components of the velocity of the craft, relative to the centre of the earth, in the oblique easterly and the oblique northerly directions by integrating these measures.

Preferably the oblique easterly and the oblique northerly components of the velocity of the craft are computed from the measures of the components of acceleration in the oblique easterly and the oblique northerly directions by first modifying each of these measures of the components of the acceleration to provide a measure of the rate of change of the velocity component in the corresponding direction by adding to, or subtracting from, the measure of the acceleration component, one or more modifying quantities derived in such a manner that they measure severally or collectively a part or parts of the acceleration in the said direction that is, or are, produced by turning of the direction of each of one or more of the components of the velocity of the craft that are in directions perpendicular to the direction of the said acceleration component, due to the turning of the said velocity components in space.

Figure 3:
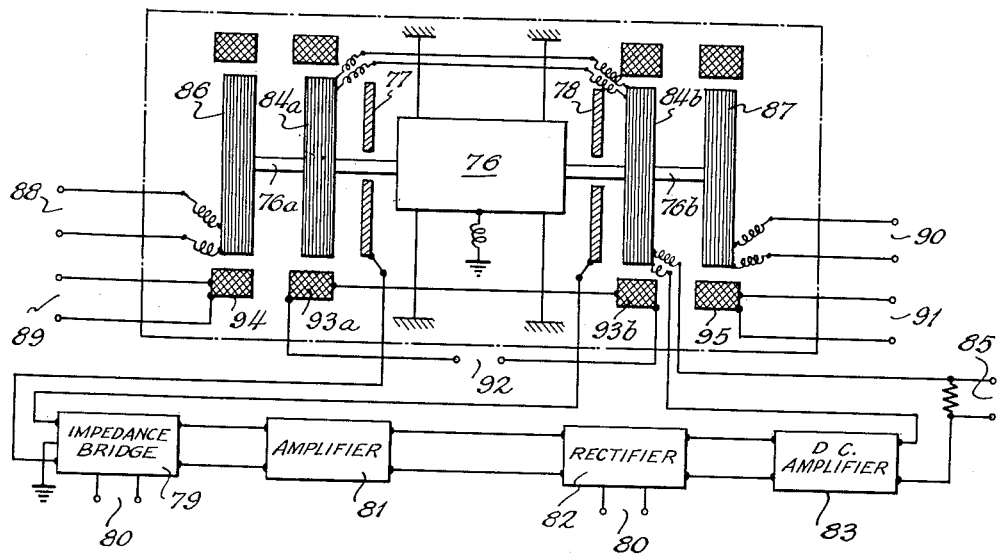
Figure 2B:
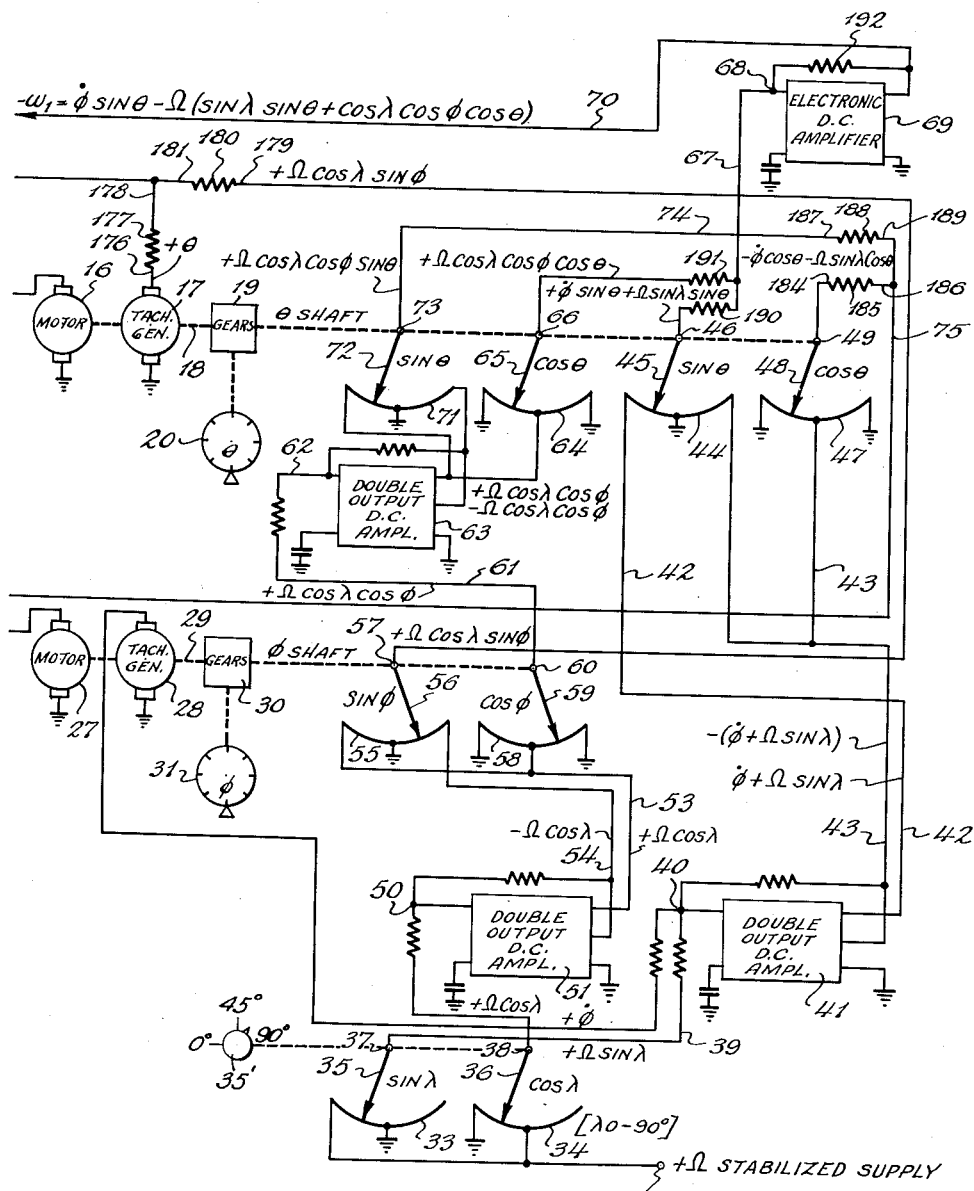
Figure 2A:
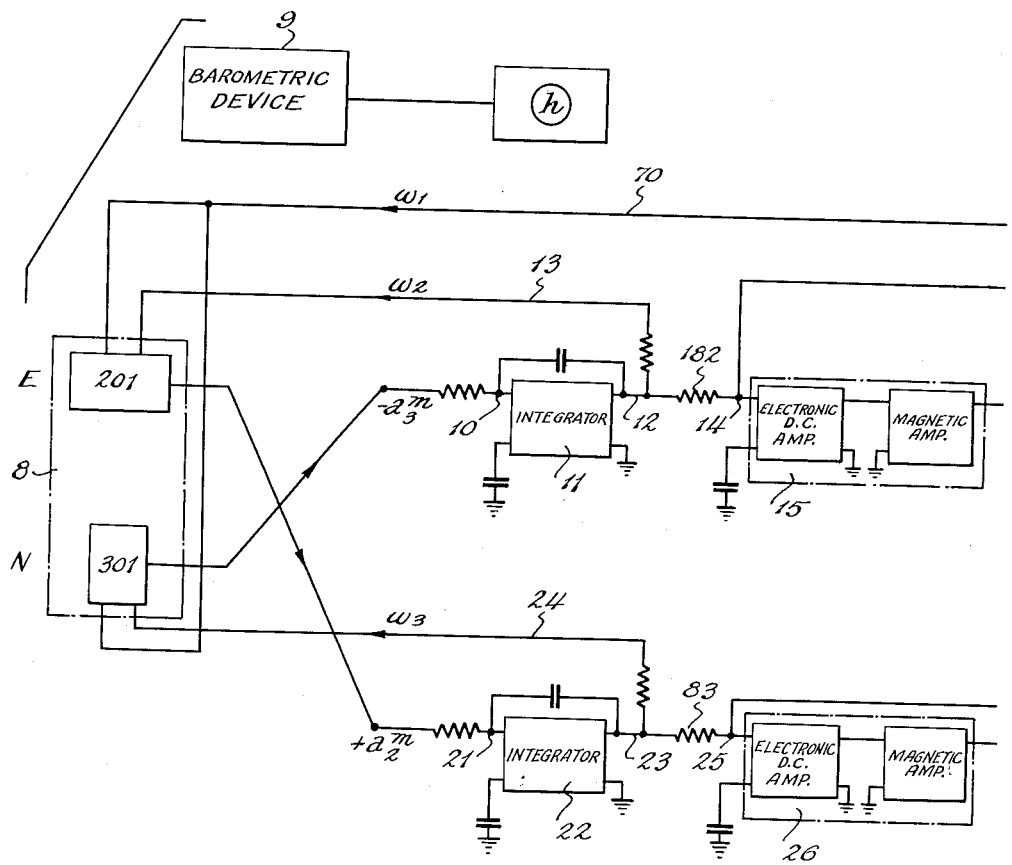

An embodiment of the invention will now be described with reference to the drawings accompanying the provisional specification in which:

Figure 1 is a representation of the earth and the position of the craft on the earth with respect to an oblique or selected co-ordinate system, Figures 2A and 2B together form a diagrammatic illustration of the system including the accelerometers and computer and, Figure 3 is a diagrammatic illustration of an accelerometer suitable for use in the system.

Referring to Figure 1, the sphere 6 with radius $r$ and and centre C represents the earth. The rotational north pole is represented by N, and the angular velocity of the earth by $\Omega$. The oblique or selected polar axis is represented by PCP', the oblique or selected north pole P having an angle of true latitude $\lambda$. The oblique or selected equator is represented by 7 and the oblique or selected reference meridian is PNP'. The instantaneous position of the craft at A in terms of oblique or selected latitude and longitude is given by $\theta$, $\phi$. A1, A2, and A3 represent a set of Cartesian co-ordinate axes moving with the craft and centred on the instantaneous position of the craft at A and such that A1 is the direction of the local vertical and A2 and A3 are horizontal and respectively parallel to the local directions of oblique east and oblique north. The co-ordinate system defined by the axes A1, A2 and A3 will hereinafter be referred to as the "local co-ordinate system." Owing to the movement of the craft relative to the earth, and also owing to the angular velocity of the earth about the rotational axis CN, the local co-ordinate system will not in general be oriented in constant directions in space but will itself have an angular velocity. The components of the angular velocity of the local co-ordinate system, parallel respectively to the axes A1, A2, and A3 will be represented by $\omega_1$, $\omega_2$, and $\omega_3$, and the respective components of the acceleration of the craft A in the absence of corrections will be represented by $a_1$, $a_2$, and $a_3$.

The present embodiment provides a computing system for computing the position of the craft in terms of the oblique longitude and latitude from data provided by accelerometers measuring accelerations in the directions A2 and A3, the directions A2 and A3 pointing horizontally oblique east and oblique north respectively.

In the particular embodiment described in the specification of the aforementioned U.S. application No. 215,221, three accelerometers were mounted in the craft on a platform which was gyroscopically stabilised in such a manner that if the accelerometers were not subjected to modifying forces applied to them by extraneous devices they would respectively measure the acceleration components $a_1$, $a_2$, $a_3$ along directions directed vertically upwards, horizontally to the east and horizontally to the north at the point on the earth's surface where the craft was exactly situated, said directions forming local co-ordinate axes associated with a main spherical polar co-ordinate system having its origin at the centre of the earth and in which the position of a point was expressed in terms of three co-ordinates $r$, $\phi$ and $\theta$, where $r$ is the radius from the centre of the earth to the point, i.e., the radial distance of the craft from the earth's center, $\phi$ is the longitude of the craft and $\theta$ is its latitude. For this purpose the axes of the accelerometers were maintained vertically upwards, horizontally to the east and horizontally to the north. Extraneous forces were also applied to the accelerometers to take into account those accelerations along the respective axes resulting from rotation of the axes in space and the modified outputs of the accelerometers were integrated twice in a computer which provided measures of the height of the aircraft, its longitude $\phi$ and its latitude $\theta$. The various components that were used to modify the output of the accelerometers were also obtained from the computer.

In the particular embodiment of the present application two accelerometers 201, 301 are mounted in the aircraft on a platform 8 which is stabilized in such a manner that the axes of the accelerometers are maintained in directions pointing horizontally towards the oblique east and oblique north respectively, and it is assumed that the parts of the acceleration components in the directions of oblique east and oblique north which are produced by turning of the direction of the vertical velocity component in space, are negligible, and it is assumed that the variation of the distance $r$ of the craft A from the centre of the earth C is negligible in so far as it affects the computation from the modified acceleration components of the components of angular velocity of the local axes about the oblique easterly and oblique northerly directions. The actual height H of the aircraft above the earth's surface is measured by means other than an accelerometer, such as a barometric device 9, details of which need not be given since it may take any one of many well known forms. It will be appreciated, of course, that a third accelerometer might be used in place of the barometric device and the height H obtained by double integration of the output of the accelerometer, in the manner set forth in the prior application No. 215,221.

The method by which the accelerometers 201, 301 are gyroscopically stabilised is similar to the method described in the prior application and is more fully described in prior U.S. application No. 225,937 entitled Gyroscopically Stabilized Platforms filed May 12, 1951, in the name of Hugh Brougham Sedgfield. Accordingly since the method of stabilisation, per se, is not part of the present invention, which is concerned with utilising the output of the accelerometers supposed to be maintained in the correct relationships to the local co-ordinate axes, no further details need be given here. However, it may be useful to point out that gyroscopes controlled from pendulous devices by conventional methods will not be satisfactory for the purpose of stabilising the accelerometers because the pendulous devices will be affected by the accelerations of the craft and will produce errors in the gyroscopes and therefore in the output of the accelerometers. In fact, the reference system by which the accelerometers are stabilised must itself be determined in part by the output of the integrating system of the invention, for example, a fixed direction reference system defining fixed directions in space may be continuously corrected from the output of the integrating system of the invention so that it defines the directions in space of the local vertical, local oblique east and local oblique north at the position of the craft and the accelerometers may be maintained in these directions.

Referring again to Figure 1 and the set of right handed Cartesian axes A1, A2, A3 the expression for the components of linear accelerations of A may be written as follows:

$$a_1 = \ddot{r} - r(\omega_2^2 + \omega_3^2) \tag{1}$$

$$a_2 = \frac{d}{dt}(r\omega_3) + r\omega_1\omega_2 + \dot{r}\omega_3 \tag{2}$$

$$a_3 = -\frac{d}{dt}(r\omega_2) + r\omega_1\omega_3 - \dot{r}\omega_2 \tag{3}$$

where $\dot{r}$ is the rate of change of the radial distance of the craft from the earth's center and $\ddot{r}$ is the rate of change of the velocity of the craft from the earth's center.

In the particular embodiment of the present application, the modifying quantities applied to the accelerometers 201, 301 are respectively represented by the terms $r\omega_1\omega_2$ and $r\omega_1\omega_3$ in Equations 2 and 3 and it is assumed that the parts of the oblique easterly and oblique northerly accelerations represented respectively by the terms $\dot{r}\omega_3$ and $-\dot{r}\omega_2$ in Equations 2 and 3 are negligible. It will be appreciated of course, that further modifying quantities represented by the said terms $\dot{r}\omega_3$ and $-\dot{r}\omega_2$ might be applied respectively to accelerometers 201, 301, and that for this purpose $\dot{r}$ might be computed either by integration of the output of a vertical accelerometer or from data including the height H of the craft above the earth's surface, the said height H being measured by means other than an accelerometer such as a barometric device. Neglecting the terms $\dot{r}\omega_3$ and $-\dot{r}\omega_2$ in Equations 2 and 3, the modified accelerations, represented respectively by $a_2{}^m$ and $a_3{}^m$, are given by the expressions, $$a_2{}^m = \frac{d}{dt}(r\omega_3) \tag{4}$$

and $$a_3{}^m = -\frac{d}{dt}(r\omega_2) \tag{5}$$

From these equations we obtain for the angular velocity components $\omega_2$ and $\omega_3$ the expressions, $$\omega_2 = -\frac{1}{r}\int_F^t a_3{}^m \cdot dt + \omega_2{}^F \tag{6}$$

and $$\omega_3 = +\frac{1}{r}\int_F^t a_2{}^m \cdot dt + \omega_3{}^F \tag{7}$$

where $\omega_2{}^F$ and $\omega_3{}^F$ are respectively the values of $\omega_2$ and $\omega_3$ during a preliminary settling condition of the apparatus and are given by the expressions $$\omega_2{}^F = -\Omega \cos \lambda \sin \phi_0 \tag{8}$$

and $$\omega_3{}^F = \Omega (\sin \lambda \cos \theta_0 - \cos \lambda \cos \phi_0 \sin \theta_0) \tag{9}$$

where $\theta_0$ and $\phi_0$ are respectively the oblique latitude and oblique longitude of the craft during the settling period, and $\Omega$ and $\lambda$ are as heretofore defined.

In the particular embodiment of the present application the variation of $r$ is neglected insofar as it affects the computation of $\omega_2$ and $\omega_3$, that is the term "$r$" in Equations 6 and 7 is regarded as constant. It will be appreciated of course, that the variation of $r$ might be taken into account in determining $\omega_2$ and $\omega_3$ by means of the said Equations 6 and 7, and that for this purpose $r$ might be computed either by double integration of the output of an accelerometer arranged with its axis vertical or from data including the height H of the craft above the earth's surface, measured by means other than an accelerometer, such as a barometric device.

Thus it will be seen that by applying to the accelerometers the modifying quantities $r\omega_1\omega_2$ and $r\omega_1\omega_3$ we obtain modified outputs $a_2{}^m$ and $a_3{}^m$ from which $\omega_2$ and $\omega_3$ may be obtained by integration.

The three angular velocity components $\omega_1$, $\omega_2$, $\omega_3$ may be expressed in terms of $\Omega$, $\phi$, $\theta$ and $\lambda$ as follows:

$$\omega_1 = \dot{\phi} \sin \theta + \Omega (\sin \lambda \sin \theta + \cos \lambda \cos \phi \cos \theta) \tag{10}$$
$$\omega_2 = -\dot{\theta} - \Omega \cos \lambda \sin \phi \tag{11}$$
$$\omega_3 = \dot{\phi} \cos \theta + \Omega (\sin \lambda \cos \theta - \cos \lambda \cos \phi \sin \theta) \tag{12}$$

Equation 10 is the computing formula for $\omega_1$ and the Equations 11 and 12 re-arranged are the computing formulae for $\theta$ and $\phi$ respectively.

Referring now to the computer shown in Figs. 2A and 2B the modified acceleration signal $-a_3{}^m$ assumed to have been derived as a voltage from the accelerometer 301 is applied through a resistor to the input terminal 10 of drift-compensated integrating amplifier 11 which generates therefrom the angular velocity component $$\omega_2 = -\dot{\theta} - \Omega \cos \lambda \sin \phi$$

appearing at the output terminal 12. The measure of $\omega_2$ is supplied along a lead 13 to a winding of accelerometer 201 and a measure of $\omega_1$ is also supplied to this accelerometer by the computer as will subsequently be described. These measures of $\omega_2$ and $\omega_1$ enable the modifying quantity represented by $r\omega_1\omega_2$ to be applied to accelerometer 201. The measure of $\omega_2$ is also applied through resistor 182 to the input terminal 14, of an amplifier 15 whose output is used to energise a motor 16. It should be noted here that arrangement must be made for the angular velocity $\omega_2{}^F = -\Omega \cos \lambda \sin \phi_0$ to appear at the output of the integrator 11 during the settling condition of the apparatus so as to take account of the component of the earth's angular velocity. This may be done by means not shown but which may be similar to that shown in the prior application No. 215,221 for inserting a similar component $\Omega \cos \theta_0$. The amplifier 15 is a high-gain amplifier and is preferably compensated for drift in the manner disclosed in U.S. Patent No. 2,730,573 entitled Feed-Back Amplifier Systems and Servo Mechanisms That Are Adapted To Respond to Input Changes at Very Low Frequencies, issued January 10, 1956, in the names of Hugh Brougham Sedgfield and Frederick Arthur Summerlin. Whatever kind of amplifier is used, its input impedance must be kept low so that it may be used as a D.C. mixer amplifier in the manner disclosed in U.S. Patent No. 2,644,427 entitled Servo System, issued July 7, 1953, in the names of Hugh Brougham Sedgfield, Frederick Arthur Summerlin and George Hambly Kyte. The motor 16 is driven at a speed depending on the total input voltage to the amplifier 15. In order to ensure that the motor 16 is driven at a speed proportional to $\theta$, the output terminal of a tacho generator 17, which produces a voltage proportional to the speed of the motor 16, is connected to terminal 176 of resistor 177, and a voltage proportional to $+\Omega \cos \lambda \sin \phi$ is applied to terminal 179 of resistor 180. The manner in which the said voltage proportional to $+\Omega \cos \lambda \sin \phi$ is obtained will be described later. The terminal 178 of resistor 177 and the terminal 181 of resistor 180 are both connected to the input terminal 14 of amplifier 15. The resistance values of resistors 177, 180 and 182 are so chosen as to provide the necessary feedback for maintaining the output voltage of the tacho-generator 17, and therefore the speed of rotation of the motor 16, substantially proportional to $\theta$.

A shaft 18 is driven by the motor 16 so that its speed is proportional to $\theta$ and consequently the angle through which it rotates is proportional to $(\theta - \theta_0)$, where $\theta_0$ is the value of $\theta$ during the preliminary settling period. This shaft is indicated as the $\theta$ shaft. The shaft drives through gearing 19, an indicator 20, which after initially being set to the initial oblique latitude of the craft when the apparatus is set in motion, will continue subsequently to show the correct oblique latitude of the craft during operation of the system.

The modified acceleration signal $a_2{}^m$ assumed to have been derived as a voltage from accelerometer 201 is applied through an input resistor to the input terminal 21 of a drift-compensated integrating amplifier 22 which generates therefrom the angular velocity component $$\omega_3 = \dot{\phi} \cos \theta + \Omega (\sin \lambda \cos \theta - \cos \lambda \cos \phi \sin \theta)$$

appearing at the output terminal 23. The measure of $\omega_3$ is supplied along a lead 24 to a winding of accelerometer 301, and a measure of $\omega_1$ is also applied to this accelerometer by the computer as will be subsequently described. These measures of $\omega_3$ and $\omega_1$ enable the modifying quantity represented by $r\omega_1\omega_3$ to be applied to accelerometer 301. The measure of $\omega_3$ is also applied through resistor 83 to the input terminal 25 of an amplifier 26 whose output is used to energise a motor 27. It should be noted here that arrangement must be made for the angular velocity $$\omega_3{}^F = \Omega (\sin \lambda \cos \theta_0 - \cos \lambda \cos \phi_0 \sin \theta_0)$$

to appear at the output of the integrator 22 during the settling condition of the apparatus so as to take account of the component of the earth's angular velocity. This may be done by means (not shown) which may be similar to that shown in the prior application 215,221 for inserting a similar term $\Omega \cos \theta_0$. The amplifier 26 is a high-gain amplifier and is preferably compensated for drift in the manner described in aforementioned Patent No. 2,730,573. Whatever kind of amplifier is used its input impedance must be kept low so that it may be used as a D.C. mixer amplifier in the manner disclosed in aforementioned Patent No. 2,644,427.

The motor 27 is driven at a speed depending on the input voltage to the amplifier 26. In order to ensure that the motor 27 is driven at a speed proportional to $\overset{\bullet}{\phi}$, a voltage proportional to $-(\overset{\bullet}{\phi} \cos \theta + \Omega \sin \lambda \cos \theta)$ is applied to terminal 184 of resistor 185, and a voltage proportional to $+\Omega \cos \lambda \cos \phi \sin \theta$ is applied to terminal 187 of resistor 188. The manner in which the said voltages proportional to $-(\overset{\bullet}{\phi} \cos \theta + \Omega \sin \lambda \cos \theta)$ and $+\Omega \cos \lambda \cos \phi \sin \theta$ are obtained will be described later. It may be stated here that the voltage proportional to $-(\overset{\bullet}{\phi} \cos \theta + \Omega \sin \lambda \cos \theta)$ is computed from data including the output voltage of a tacho generator 28, the said output voltage being proportional to the speed of the motor 27. The terminal 186 of resistor 185 and the terminal 189 of resistor 188 are both connected to the input terminal 25 of amplifier 26. The resistance values of resistors 183, 185 and 188 are so chosen as to provide the necessary feedback for maintaining the output voltage of the tacho generator 28 and therefore the speed of rotation of the shaft 29 substantially proportional to $\overset{\bullet}{\phi}$.

A shaft 29 is driven by the motor 27 so that its speed is proportional to $\overset{\bullet}{\phi}$ and consequently the angle through which it rotates is proportional to $(\phi - \phi_0)$, where $\phi_0$ is the value of $\phi$ during the preliminary settling period. This shaft is indicated as the $\phi$ shaft. The shaft drives, through gearing 30, an indicator 31 which, after initially being set to the initial oblique longitude of the craft when the apparatus is set in motion, will continue subsequently to show the correct oblique longitude of the craft during operation of the system.

In order to compute the various terms involving $\lambda$ and $\Omega$ a voltage proportional to $\Omega$ is applied to the terminal 32. This voltage is applied to two potentiometers 33, 34 which are of a special construction in that they provide output voltages on their sliders 35, 36 respectively that are proportional to the input voltage multiplied by the sine and cosine of the angles represented by the angular position of the sliders. Thus, if the sliders 35, 36 are set by an operator to an angle representing a predetermined $\lambda$ by means of the manual setting knob 35; the output at the terminal 37 will be $\Omega \sin \lambda$ and the output at terminal 38 will be $\Omega \cos S$. The output from terminal 37 is applied along lead 39 through a resistor to the input terminal 40 of a drift-compensated amplifier 41, to the input terminal of which there is also applied through a resistor a voltage proportional to $\overset{\bullet}{\phi}$ obtained from the tacho generator 28 driven by the motor 27. The amplifier is of the kind that produces two output voltages. The two input resistors connected respectively between lead 39 and the amplifier input terminal 40 and between the output terminal of tacho-generator 28 and the amplifier input terminal 40, and also the feedback resistor connected between the input terminal 40 and output terminal 43 of amplifier 41, are so chosen that the output voltages of amplifier 41 appearing in leads 42 and 43 are respectively $(\overset{\bullet}{\phi} + \Omega \sin \lambda)$ and $-(\overset{\bullet}{\phi} + \Omega \sin \lambda)$. The output in the lead 42 is applied as an input to one terminal of a potentiometer 44 and the output in the lead 43 is applied as an input to its other terminal. The potentiometer 44 is of special construction since it provides an output voltage on its slider 45 that is proportional to the input voltage which is applied in lead 42 multiplied by the sine of the angle represented by the angular position of the slider. In the present case the slider is angularly positioned by the $\theta$ shaft so that the input voltages produce an output voltage at the terminal 46 which is proportional to $$\overset{\bullet}{\phi} \sin \theta + \Omega \sin \lambda \sin \theta$$

The output voltage in the lead 43 is applied to a potentiometer 47 which is designed to provide an output voltage on its slider 48 that is proportional to the input voltage multiplied by the cosine of the angle represented by the angular position of the slider. Here again the slider 48 is positioned by the $\theta$ shaft so that the output of the potentiometer at the terminal 49 is proportional to $-\overset{\bullet}{\phi} \cos \theta - \Omega \sin \lambda \cos \theta$. Terminal 49 is connected to terminal 84 of resistor 85, so that the voltage proportional to $-(\overset{\bullet}{\phi} \cos \theta + \Omega \sin \lambda \cos \theta)$ is applied to terminal 84 as has been previously described.

Returning now to the output of the cosine potentiometer 34, the output voltage at the terminal 38 which is proportional to $\Omega \cos \lambda$ is applied through a resistor to the input terminal 50 of drift-compensated amplifier 51 which provides two output voltages in the leads 53, 54 respectively measuring $+\Omega \cos \lambda$, and $-\Omega \cos \lambda$. The voltage $-\Omega \cos \lambda$ in lead 54 and the voltage $\Omega \cos \lambda$ in the lead 53 are separately applied to two terminals of a potentiometer 55 which is designed to provide an output voltage proportional to the input voltage which is applied in lead 53 multiplied by the sine of the angle represented by the angular position of the wiper arm 56. The wiper arm 56 is positioned by the $\phi$ shaft so that the output voltage appearing at the output terminal 57 is proportional to $\Omega \cos \lambda \sin \phi$. Terminal 57 is connected to terminal 179 of resistor 180, so that the voltage proportional to $+\Omega \cos \lambda \sin \phi$ is applied to terminal 79 as has been previously described.

The voltage $\Omega \cos \lambda$ in the lead 53 is applied as an input to the potentiometer 58 which provides an output voltage proportional to the input voltage multiplied by the cosine of the angle represented by the angular position of the wiper arm 59. The wiper arm 59 is positioned by the $\phi$ shaft so that the output voltage of the potentiometer appearing at the output terminal 60 is proportional to $\Omega \cos \lambda \cos \phi$. This output voltage is applied along the lead 61 through a resistor to the input terminal 62 of a drift-compensated amplifier 63, which provides two output voltages $+\Omega \cos \lambda \cos \phi$ and $-\Omega \cos \lambda \cos \phi$. The former is applied as an input to a cosine potentiometer 64 similar to cosine potentiometer 47 such that its wiper arm 65 is rotated by the $\theta$ shaft and the output appearing at the terminal 66 is proportional to $+\Omega \cos \lambda \cos \phi \cos \theta$. The terminal 46 is connected to one terminal of a resistor 190 the other terminal of which is connected to the input terminal 68 of amplifier 69, and the terminal 66 is connected to one terminal of resistor 191 the other terminal of which is also connected to terminal 68. The resistance values of resistors 190 and 191, and also of the feedback resistor 192 are so chosen as to maintain the output voltage of the amplifier 69 in lead 70 proportional to $$-\overset{\bullet}{\phi} \sin \theta - \Omega (\sin \lambda \sin \theta + \cos \lambda \cos \phi \cos \theta)$$

It will be seen from Equation 10 that this expression is equal to $-\omega_1$. The output in lead 70 is supplied to each of the accelerometers 201, 301, to enable the modifying quantities represented by $r\omega_1\omega_2$ and $r\omega_1\omega_3$ to be applied to these accelerometers as has been previously described.

The other output $-\Omega \cos \lambda \cos \phi$ from the amplifier 63 and the output $\Omega \cos \lambda \cos \phi$ are applied separately to two terminals of a sine potentiometer 71 similar to the sine potentiometer 44. The potentiometer 71 has its wiper arm 72 rotated by the $\theta$ shaft so that its output voltage at the terminal 73 is proportional to $$\Omega \cos \lambda \cos \phi \sin \theta$$

Terminal 73 is connected to terminal 187 of resistor 188, so that the voltage proportional to $+\Omega \cos \lambda \cos \phi \sin \theta$, is applied to terminal 187 as has been previously described.

So far there has been described a computing system which computes the height of the aircraft and its oblique longitude and oblique latitude in terms of any oblique co-ordinate system chosen by selecting the value of $\lambda$ and which also derives measures of $\omega_1$, $\omega_2$, $\omega_3$, the angular velocities about the local co-ordinate axes $A_1$, $A_2$, $A_3$. These measures of $\omega_1$, $\omega_2$, $\omega_3$, are used as has been mentioned previously to modify the operation of the accelerometers 201, 301 so as to cause them to provide output quantities which are substantially measures of the rates of change of the velocities along the directions A2, A3, and so that these quantities when integrated provide measures of the velocities along the axes A2, A3.

It will be appreciated that if $\lambda$ is chosen to be 0° the oblique poles will be diametrically opposed points on the terrestrial equator and the functions to be computed will be much simpler since sin $\lambda$ and cos $\lambda$ will respectively become 0 and 1. Moreover the apparatus required will not be quite so complicated. Again if $\lambda$ is chosen to be 90° the oblique poles will coincide with the earth's rotation poles and again the functions to be computed and the apparatus required will be much simpler. Neither system will operate satisfactorily within 20° of the pole adopted. It will be appreciated, however, that a system in which $\lambda$ is chosen to be 0° could operate satisfactorily at or near the terrestrial equator, provided the co-ordinate poles are selected as equatorial points more than 20° from the position of the craft. A convenient system would be to provide a computer which would operate either with the co-ordinate poles coinciding with the earth's rotation poles or with the co-ordinate poles at a selected pair of diametrically opposed points at the rotation equator with a multipole switching device for switching from one system to the other as desired.

An accelerometer suitable for use as either of the accelerometers 201, 301 is shown in Fig. 3. This accelerometer is of the type more fully described in co-pending U.S. application No. 220,496 entitled Accelerometers, filed April 11, 1951, now Patent No. 2,888,256 in the name of Hugh Brougham Sedgfield and is so designed that the desired modifying quantities may be applied to it. It comprises essentially a movable element 76 mounted in a supporting casing by means of a resilient suspension so that it has substantially only one degree of freedom of movement along the direction of the axes of shafts 76a and 76b which extend from it in opposite directions. This movable element forms the moving plate of a differential capacitor having fixed plates 77 and 78, which forms part of an impedance bridge 79 energised by an alternating current source 80. The output of this bridge has an amplitude proportional to any displacement of the movable element 76 from its position of rest and a phase-sense relative to source 80 dependent on the sense of such displacement. This output after amplification in amplifier 81 is fed to a phase-sense sensitive rectifier 82 which provides a D.C. signal indicative in magnitude and polarity of the magnitude and sense of any displacement of the movable element 76. This signal is amplified in D.C. amplifier 83 and fed to coils 84a and 84b mounted on the shafts 76a and 76b respectively and located in air gaps in a magnetic field system produced by a double electromagnet energised by coils 93a and 93b, which are supplied with direct current from a source 92. Alternatively this electro-magnet may be replaced by a double permanent magnet. When the coils 84a and 84b are energised from the output of amplifier 83 they provide a force on the element 76 tending to restore it to the position in which the impedance bridge 79 is balanced. The output from amplifier 83 also appears at the output terminals 85 and is a measure of the force imparted to the element by the current in coils 84a and 84b to keep the element central against the action of external forces or to counter the effects on the element of acceleration of the craft. Therefore if no modifying forces are exerted the output at terminals 85 measure the acceleration of the craft along the axis of the accelerometer. To enable the modifying quantities to be fed to the accelerometer so that the signal at the output terminals 85 is a measure not of the true accelerations, but of the acceleration as modified in accordance with the principles of the aforementioned application No. 215,221, two further coils 86 and 87 are mounted on the movable element 76, one on shaft 76a and the other on shaft 76b so as to be within electro-magnetic fields produced respectively by coils 94 and 95 fixed to the casing of the accelerometer. Each pair of coils 86, 94 and 87, 95 provides a force on the movable element which is proportional to the product of the currents flowing in the coils not only in magnitude but also in sign. Terminals 88, 89, 90 and 91 are provided for supplying the currents to coils 86, 94, 87 and 95 respectively. In the present case only one pair of corresponding coils need be used since for accelerometers 201, 301 only the product of two angular velocity components are used to modify the outputs of the accelerometers.

As has already been stated, the method of maintaining the accelerometers in the correct relation to the local co-ordinate axes is not, per se, part of the present invention, but it may involve the use of a gyroscopic system of stabilisation as set out in the specification of aforementioned application No. 225,937. In this system the quantities $\omega_1$, $\omega_2$, $\omega_3$, produced as described above, are used to control the gyroscopes that stibilise the accelerometers to keep them and therefore the accelerometers, very accurately parallel to the local co-ordinate axes.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim:

1. Navigation apparatus comprising means including settable means for defining a selected coordinate system, the poles and equator of said selected coordinate system being angularly displaced in accordance with the setting of said settable means with respect to the earth's true co-ordinate system, means for measuring the components of the acceleration of a moving craft in at least two of the directions of the axes of a local co-ordinate system located at the position of the craft, moving therewith, and having its axes directed at each position of the craft in the vertical direction and in horizontal northerly and horizontal easterly directions, respectively, with respect to said selected coordinate system, the setting of said selected coordinate system being dependent upon the position of said craft with respect to the earth's true co-ordinate system, and means responsive to said measuring means for computing the components of the velocity of said craft relative to the center of the earth in at least said two directions.

2. Navigation apparatus as claimed in claim 1 wherein the direction of the local co-ordinate axes are in said selected easterly, selected northerly and vertical directions, respectively, and wherein the velocity components in said selected easterly and northerly horizontal directions relative to the center of the earth are computed by means integrating the measures of the component accelerations in these directions.

3. In navigation apparatus, means including adjustable means defining a selected coordinate system angularly displaced with respect to the earth's true coordinate system in accordance with the adjustment of said adjustable means, means for measuring the components of the acceleration of a moving craft in horizontal easterly and horizontal northerly directions with respect to said selected coordinate system, said angular displacement of said selected coordinate system being dependent upon the position of said craft with respect to the earth's true co-ordinate system, and means responsive to said measuring means for computing the longitude and the latitude of said craft with respect to said selected coordinate system.

4. Navigation apparatus as claimed in claim 3 wherein the longitude and latitude of the craft with respect to said selected coordinate system are computed from the measures of the components of the velocity of the craft, relative to the center of the earth in easterly and northerly directions with respect to said selected coordinate system by means integrating these measures.

5. Navigation apparatus as claimed in claim 1 wherein said easterly and northerly components of the velocity of the craft are computed from the measures of the components of acceleration in said easterly and northerly directions by means modifying each of these measures of the components of the acceleration to provide a measure of the rate of change of the velocity component in the corresponding direction by algebraically adding to the measure of the acceleration component, quantities derived in such a manner that they measure the acceleration in the said direction produced by turning of the direction of each of the components of the velocity of the craft that are in directions perpendicular to the direction of the said acceleration component, due to the turning of the said velocity components in space.

6. Navigation apparatus as claimed in claim 3 wherein said easterly and northerly components of the velocity of the craft are computed from the measures of the components of acceleration in said easterly and northerly directions by means modifying each of these measures of the components of the acceleration to provide a measure of the rate of change of the velocity component in the corresponding direction by algebraically adding to the measure of the acceleration component, quantities derived in such a manner that they measure the acceleration in the said direction produced by turning of the direction of each of the components of the velocity of the craft that are in directions perpendicular to the direction of the said acceleration component, due to the turning of the said velocity components in space.

7. Apparatus for use in a navigation system as claimed in claim 1 comprising a plurality of accelerometers gyroscopically stabilized so that, if their operation were not modified by modifying quantities applied to them by extraneous devices, they would measure components of the acceleration of the craft along at least two of the local co-ordinate axes, a plurality of integrators for deriving, from the measures provided by the accelerometers, measures of the components of the craft's velocity relative to the center of the earth, and computing means for deriving and applying to the accelerometers modifying quantities corresponding to the components of the acceleration of the craft that are due to turning of components of the craft's velocity with turning of the local co-ordinate axes in space.

8. Apparatus for use in a navigation system as claimed in claim 3 comprising a plurality of accelerometers gyroscopically stabilized so that, if their operation were not modified by modifying quantities applied to them by extraneous devices, they would measure components of the acceleration of the craft along at least two of the local co-ordinate axes, a plurality of integrators for deriving, from the measures provided by the accelerometers, measures of the components of the craft's velocity relative to the center of the earth, and computing means for deriving and applying to the accelerometers modifying quantities corresponding to the components of the acceleration of the craft that are due to turning of components of the craft's velocity with turning of the local co-ordinate axes in space.

9. Apparatus as claimed in claim 7 including means for providing said modifying quantity from the product of the measure of the component of the craft's velocity in the direction of another of the local axes as computed in the system and the measure of the component angular velocity of the local co-ordinate axes about the third local co-ordinate axis which angular velocity is computed in the system from one or more of the computed measures of the components of the velocity of the craft whereby the modifying quantity is used to modify a measure of the component of the acceleration in the direction of one of the local co-ordinate axes so as to convert it into a measure of the rate of change of the velocity component in the corresponding direction.

10. Apparatus as claimed in claim 9 including means for applying the modifying quantity to operate directly on an accelerometer so that the output provided by the accelerometer is a measure of the rate of change of the component of the velocity of the craft in the direction of the corresponding local axis.

11. Apparatus as claimed in claim 1 in which the local co-ordinate axes are said easterly, northerly and vertical directions and in which the measure of the acceleration in the direction of each of said easterly and northerly axes is provided by an accelerometer adapted to measure acceleration along an axis of response which is maintained parallel to the said axis.

12. Apparatus as claimed in claim 2 for use where travel of the craft produces small changes in the magnitude of the vertical co-ordinate including means for providing from the product of the computed measure of the craft's velocity in the direction of a horizontal component and of a computed measure of the component of the angular velocity of the local selected co-ordinate axis about the vertical axis one modifying quantity for each of the measures of the horizontal components of the craft's acceleration in said easterly and northerly directions.

13. Apparatus as claimed in claim 2 for use where travel of the craft produces small changes in the magnitude of the vertical co-ordinate including means for providing from the product of the computed measure of the craft's velocity in the direction of a horizontal component and of a computed measure of the component of the angular velocity of the local selected co-ordinate axis about the vertical axis one modifying quantity for each of the measures of the horizontal components of the craft's acceleration in said easterly and northerly directions.

14. Apparatus as claimed in claim 11 including means for modifying the operation of the two accelerometers by subtracting quantities that are respectively measures of $$+r\omega_2\omega_1 \quad \text{and} \quad +r\omega_3\omega_1$$

where $r$ is the radial distance of said craft from the earth's center, $\omega_1$, $\omega_2$, and $\omega_3$ are the components of the angular velocity of said local coordinate system parallel respectively to said vertical, easterly and northerly axes.

15. Apparatus as claimed in claim 7 in which the output signals from the accelerometers are in the form of voltages constituting measures of the rate of change of components of the velocity of the craft, and integrating amplifiers responsive to said accelerometer output signals for providing outputs which are used as measures of said components of the craft's velocity, said integrating amplifiers including means so that when the craft is stationary with respect to the earth's surface, the outputs of the integrating amplifiers which measure the components of the craft's velocity directed horizontally to said north and horizontally to said east have values representative of the angular velocities of the craft through space about said easterly and northerly directions, respectively, due to the spin of the earth about its polar axis.

16. Apparatus as claimed in claim 7 in which the output signals from the accelerometers are in the form of voltages constituting measures of the rate of change of components of the velocity of the craft, and integrating amplifiers responsive to said accelerometer output signals for providing outputs which are used as measures of said components of the craft's velocity and further including an integrating motor responsive to the measure of the components of the craft's velocity along said horizontal easterly direction, a shaft driven by the motor, computing means for computing a signal in accordance with the formula $-\dot{\phi}\cos\theta-\Omega(\sin\lambda\cos\theta-\cos\lambda\cos\phi\sin\theta)$ where $\dot{\phi}$ is a measure of the speed of rotation of the shaft including means for adding said signal as an input to energize the motor whereby the shaft rotates at a speed proportional to $\dot{\phi}$, that is, at a speed proportional to the rate of change of said selected longitude and the extent of rotation of the shaft is proportional to the change of said selected longitude, $\theta$ is a measure of the selected latitude, $\Omega$ is a measure of the angular velocity of the earth, $\lambda$ is a measure of the angle of true latitude, and $\phi$ is a measure of the selected longitude.

17. Apparatus as claimed in claim 7 in which the output signals from the accelerometers are in the form of voltages constituting measures of the rate of change of components of the velocity of the craft, and integrating amplifiers responsive to said accelerometer output signal for providing outputs which are used as measures of said components of the craft's velocity and further including an integrating motor responsive to the measure of the component of the craft's velocity along said horizontal northerly direction, a shaft driven by the motor, means for computing a signal in accordance with the formula $\dot{\theta}+\Omega\cos\lambda\sin\phi$ where $\dot{\theta}$ is a measure of the speed of rotation of the shaft including means for adding said signal as an input to energize the integrating motor, whereby the shaft rotates at a speed proportional to $\dot{\theta}$, that is, at a speed proportional to the rate of change of said selected latitude of the craft and the extent of rotation of the shaft is a measure of the change of said selected latitude, $\Omega$ is a measure of the angular velocity of the earth, $\lambda$ is a measure of the angle of true latitude, and $\phi$ is a measure of the selected longitude.

18. Apparatus as claimed in claim 16 including a second integrating motor responsive to the measure of the component of the craft's velocity along said horizontal northerly direction, a second shaft driven by the second motor, means for computing a second signal in accordance with the formula $\dot{\theta}+\Omega\cos\lambda\sin\phi$ where $\dot{\theta}$ is a measure of the speed of rotation of the shaft and for adding said second signal as an input to energize the second integrating motor whereby the second shaft rotates at a speed proportional to $\dot{\theta}$, that is, at a speed proportional to the rate of change of said selected latitude of the craft and the extent of rotation of the second shaft is a measure of the change of said selected latitude, $\Omega$ is a measure of the angular velocity of the earth, $\lambda$ is a measure of the angle of true latitude, and $\phi$ is a measure of the selected longitude.

19. Apparatus as claimed in claim 16 wherein the computing means includes means for adjusting the value of $\lambda$, $\lambda$ being a measure of the angle of true latitude.

20. Apparatus as claimed in claim 17 wherein the computing means includes means for adjusting the value of $\lambda$, $\lambda$ being a measure of the angle of true latitude.

21. Apparatus as claimed in claim 18, wherein the computing means includes means for adjusting the value of $\lambda$, $\lambda$ being a measure of the angle of true latitude.

22. Navigation apparatus comprising means for measuring the acceleration of a moving craft along two perpendicular axes of a local coordinate system located at the position of the craft, moving therewith, with its axes directed at each position of the craft in the vertical direction and in horizontal northerly and horizontal easterly directions, respectively, with respect to a displaced coordinate system, the poles and equator of which are displaced with respect to the earth's true coordinate system, stabilizing means for continuously maintaining the axes of said acceleration measuring means aligned with the respective axes of said local coordinate system, and means including integrating means responsive to said measure of acceleration for computing the position of said craft with respect to a reference position in said displaced coordinate system.

23. Navigation apparatus as claimed in claim 22 wherein the poles and equator of the displaced coordinate system are displaced 90° with respect to the earth's true coordinate system.

References Cited in the file of this patent

UNITED STATES PATENTS

| | | |
|---|---|---|
| 1,728,904 | Herr | Sept. 17, 1929 |
| 2,109,283 | Boykow | Feb. 22, 1938 |
| 2,613,071 | Hansel | Oct. 7, 1952 |
| 2,762,123 | Schultz | Sept. 11, 1956 |
| 2,853,287 | Draper et al. | Sept. 23, 1958 |